United States Patent
Nishiyama (10) Patent No.: US 6,992,850 B2
(45) Date of Patent: Jan. 31, 2006

(54) MAGNETIC DISK DRIVE REDUCING INFLUENCE OF RIGIDITY OF TRANSMISSION LINES ON SUSPENSION

(75) Inventor: Nobumasa Nishiyama, Fujisawa (JP)

(73) Assignee: Hitachi Global Storage Technologies Japan, Ltd., Odawara (JP)

(*) Notice: Subject to any disclaimer, the term of this patent is extended or adjusted under 35 U.S.C. 154(b) by 0 days.

(21) Appl. No.: 10/783,692

(22) Filed: Feb. 20, 2004

(65) Prior Publication Data

US 2004/0165305 A1    Aug. 26, 2004

(30) Foreign Application Priority Data

Feb. 24, 2003 (JP) .............................. 2003-046395

(51) Int. Cl.
*G11B 21/02* (2006.01)

(52) U.S. Cl. .............................................. 360/75
(58) Field of Classification Search ............... 360/75
See application file for complete search history.

(56) References Cited

U.S. PATENT DOCUMENTS

| 6,476,993 B1 | 11/2002 | Aoki |
| 6,714,499 B2 | 3/2004 | Katayama |
| 2003/0142445 A1 * | 7/2003 | Maimone et al. ........ 360/245.9 |

FOREIGN PATENT DOCUMENTS

| JP | 05-020635 A | 1/1993 |
| JP | 06-189376 A | 7/1994 |
| JP | 11-007612 A | 1/1999 |
| JP | 2000-357377 A | 12/2000 |
| JP | 2001-034913 A | 2/2001 |
| JP | 2002-074869 A | 3/2002 |
| JP | 2002-093086 A | 3/2002 |

* cited by examiner

*Primary Examiner*—David Hudspeth
*Assistant Examiner*—Mitchell Slavitt
(74) *Attorney, Agent, or Firm*—Townsend and Townsend and Crew LLP (57) ABSTRACT

A magnetic disk drive having a two-stage actuator function and a TAF slider function comprises: signal superposing means 6 to reduce the number of transmission lines to be employed, by merging the control signal for a piezoelectric element 37 for the two-stage actuator function and the control signal for a heating resistor 38 for the TAF slider function into a single type of signal on preamplifier 26 side of the spring-load position; and signal separating means for separating the merged signal into the control signal for piezoelectric element 37 for the two-stage actuator function and the control signal for a heating resistor 38 for the TAF slider function on magnetic head 14 side of the spring-load position by use of interline crosstalk to control the respective functions.

12 Claims, 6 Drawing Sheets

(a) 
A FEW TENS OF NANOSECONDS (b) 
A FEW TENS OF MILLISECONDS (c) 
A FEW TENS OF NANOSECONDS (d) 
A FEW TENS OF MILLISECONDS

MAGNETIC DISK DRIVE REDUCING INFLUENCE OF RIGIDITY OF TRANSMISSION LINES ON SUSPENSION

CROSS-REFERENCE TO RELATED APPLICATION

This application claims priority from Japanese Application No. 2003-046395, filed Feb. 24, 2003, the entire disclosure of which is incorporated by reference for all purposes.

BACKGROUND OF THE INVENTION

The present invention relates to a magnetic disk drive with a head gimbal assembly (HGA) including two or more types of control function units, and more particularly to a technique which is effective when applied to an HGA having a so-called two-stage actuator function and thermal asperity floating-control (TAF) slider function.

One proposed technique for precisely controlling the position of the magnetic head in a magnetic disk drive employs a two-stage actuator function to provide rough and fine head positioning movements in order to position the magnetic head at a desired location on the surface of the magnetic disk in a read/write operation (for example, see Japanese Patent Laid-Opens Nos. 2002-93086, 2002-74869, and 2000-357377). Briefly, in this technique, the magnetic head is driven by both a voice coil motor and the dimensional change of a piezoelectric element.

In order to improve the read/write characteristics of the magnetic head in this type of magnetic disk drive, another proposed technique employs a TAF slider function for controlling the flying height of the magnetic head above the magnetic disk surface (for example, see Japanese Patent Laid-Open No. 5-20635). Briefly, this technique forms a thin-film resistor together with a coil within the insulation layer enclosed by the lower and upper magnetic poles of the magnetic head, and causes the thin-film resistor to generate heat by passing a current through it. As a result, the end portion of the magnetic pole of the magnetic head protrudes, reducing the gap between the end portion of the magnetic pole and the surface of the magnetic disk.

The above techniques for magnetic disk drives employing a two-stage actuator function and a TAF slider function have the following problems. In the technique of above-mentioned Japanese Patent Laid-Open No. 5-20635, which employs a TAF slider function, for example, since the coil and the thin-film resistor are disposed close to each other, passing a current through the resistor to control it may affect the read/write characteristics of the magnetic head. Further, in recent years, there has been a need to carry out servo tracking at high speed with precision, as well as to lower and control the flying height of the head with precision in magnetic disk drives, requiring an HDA having a two-stage actuator function and a TAF slider function which match these controls.

Employing these two types of functions at the same time, however, may cause the following problems. Each of these functions requires a transmission line consisting of two conductors (for go and return currents) as control lines. Therefore, if these features are simply incorporated into the HDA without special arrangements, two control lines (each consisting of two conductors) must be installed in addition to the two transmission lines for the read/write signals of the magnetic head, totaling four transmission lines (8 conductors) to be disposed on the suspension.

The suspension, on the other hand, is designed to apply a load to float the slider. This load is set so that the flying height of the slider is precisely set to a target value. If, however, four transmission lines (8 conductors) are disposed, the total rigidity of the transmission lines increases, making it difficult to control the flying height using the load set for the suspension alone. Specifically, the rigidity of the transmission lines affects the spring load of the HGA and causes variations in the flying height, changing the flying characteristics, and hence the read/write characteristics of the magnetic head.

SUMMARY OF THE INVENTION

In one aspect of the invention, a magnetic disk drive includes a magnetic head for writing/reading information to/from a magnetic recording medium, a preamplifier for exchanging read/write information with said magnetic head, and two or more types of control function units provided in said magnetic head. The magnetic disk drive further includes signal superposing means for merging two or more types of transmission lines into a single type of transmission line on the preamplifier side of a spring load position of a suspension, the two or more types of transmission lines transmitting control signals for the two or more types of control function units, and signal separating means for dividing the single type of transmission line into two or more types of transmission lines on the magnetic head side of the spring load position of the suspension.

In some embodiments, the two or more types of control function units include a first control function unit for implementing a two-stage actuator function and a second control function unit for implementing a flying height control slider function. In some embodiments, the signal superposing means merges a first transmission line and a second transmission line into a third transmission line, the first transmission line transmits a control signal for the first control function unit, the second transmission line transmits a control signal for the second control function unit, and each transmission line consists of two conductors. In some embodiments, the signal separating means divides the merged third transmission line into a fourth transmission line and a fifth transmission line, the fourth transmission line transmits a control signal for the first control function unit, the fifth transmission line transmits a control signal for the second control function unit, and each transmission line consists of two conductors.

In some embodiments, the signal superposing means superposes a signal of a first frequency with a signal of a second frequency for controlling a heating resistor of the second control function unit and transmits the superposed signal through the third transmission line, where the first frequency is able to drive a piezoelectric element of the first control function unit, and the second frequency is higher than the first frequency and unable to drive the piezoelectric element of the first control function unit. The signal of the second frequency may be made up of a sinusoidal signal.

In some embodiments, the signal separating means uses interline crosstalk generated from the fourth transmission line to separate the signal of the second frequency and controls the heating resistor of the second control function unit through the fifth transmission line, with the fourth transmission line being connected to the third transmission line, which transmits the superposed signal obtained as a result of superposing the signal of the first frequency with the signal of the second frequency.

Embodiments of the present invention are used in a magnetic disk drive with a head gimbal assembly (HGA) having two or more types of control functions, such as a two-stage actuator function and a TAF slider function, and embodiments address the problem of excessive rigidity of the transmission lines. Thus a magnetic disk drive according to embodiments of the invention has a reduced number of transmission lines, and thereby a reduced total rigidity of the transmission lines. Thus the influence of rigidity on the floating control can be reduced using the load set for the HGA alone.

In another aspect, the present invention reduces the number of transmission lines installed on the arm suspension of the HGA in a magnetic disk drive, the transmission lines transmitting signals for controlling two or more types of functions. This reduction is accomplished in such a way that a signal superposing means merges two or more types of control signals into a single type of control signal on the preamplifier side of the spring-load position. Then, a signal separating means separates the merged control signal into two or more types of control signals by use of interline crosstalk to control two or more types of functions.

In a particular implementation, a magnetic disk drive includes a magnetic head having a two-stage actuator function and a TAF slider function. The present invention superposes the controls signals for the two-stage actuator function and the TAF slider function on each other and transmits the superposed signal through a transmission line (consisting of two conductors) and then separates it into signals for controlling these functions on the magnetic head side of the spring-load position of the suspension by use of interline crosstalk. For example, a control signal of a low frequency which can activate the piezoelectric element for the two-stage actuator function is superposed with a control signal of a high frequency which cannot activate the piezoelectric element but can cause the heating resistor for the TAF slider function to generate heat.

Accordingly, the control signals for the two-stage actuator function and the TAF slider function can be superposed on each other without interfering with each other, and, furthermore, interline crosstalk can be used to easily implement the above arrangement in a simple configuration. Extra energy is not required to separate the signals, and only a minimum of transmission lines are required, making it possible to contribute to the reduction of the weight of the suspension.

As the number of functions of a magnetic disk drive increases, so does the number of transmission lines of the drive, resulting in an increase in the total rigidity of the transmission lines. The present invention can decrease the number of the transmission lines to reduce the influence of the rigidity of the transmission lines on the amount of load on the arm suspension at the spring-load position. With this arrangement, it is possible to reduce the influence of the rigidity of the transmission lines on the flying height of the magnetic head controlled by the spring-load, enhancing the read/write characteristics and reliability.

A further understanding of the nature and advantages of the present invention may be realized by reference to the remaining portions of the specification and the drawings.

DESCRIPTION OF SPECIFIC EMBODIMENTS

Figure 1:
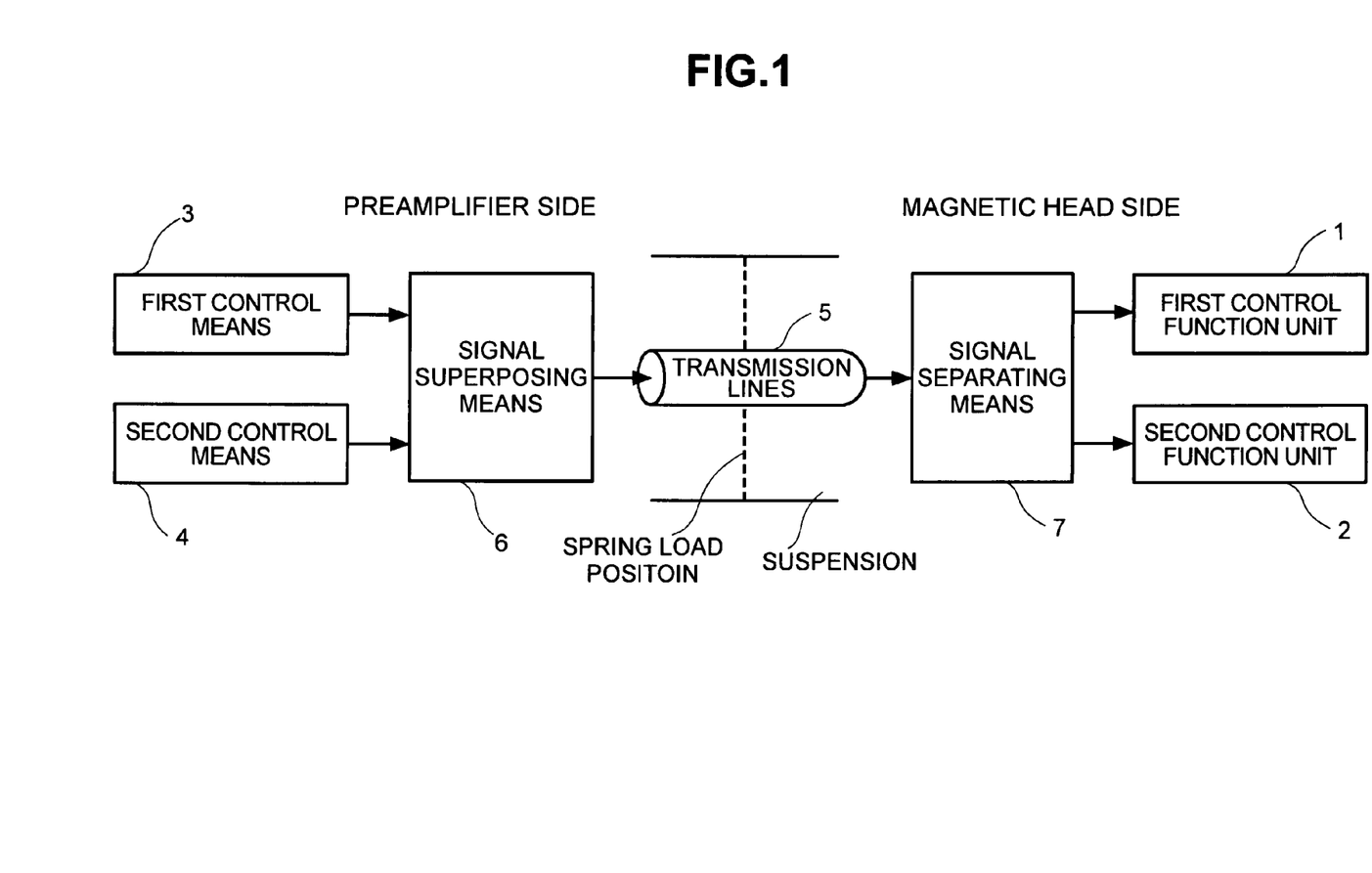
FIG. 1 is a diagram showing the basic configuration of the main functional units of a magnetic disk drive according to the present invention.

FIG. 1 is a diagram showing the basic configuration of the main functional units of a magnetic disk drive according to an embodiment of the present invention. The magnetic disk drive according to this embodiment comprises a magnetic head for writing/reading information to/from a magnetic recording medium, and a preamplifier for exchanging read/write information with the magnetic head, wherein the magnetic head includes two or more types of control function units.

More specifically, the magnetic head includes a first control function unit 1 and a second control function unit 2, and the magnetic disk drive further comprises: a first control means 3 for controlling the first control function unit 1; a second control means four for controlling the second control function unit 2; a signal superposing means 6, on the preamplifier side of the spring load position of a suspension, for merging two types of transmission lines (each consisting of two conductors) into a single type of transmission line 5 (consisting of two conductors), the two types of transmission lines transmitting control signals for control means 3 and 4; and a signal separating means 7, on the magnetic head side of the spring load position of the suspension, for dividing the single type of transmission line 5 into two types of transmission lines.

The main functional units of the magnetic disk drive according to the present invention are basically configured as described above. A specific configuration of a magnetic disk drive according to an embodiment of the present invention includes two types of control function units, specifically a two-stage actuator function unit and a TAF slider function unit. The two-stage actuator function drives the magnetic head by use of both a voice coil motor and the dimensional change of a piezoelectric element. This function controls the position of the magnetic head in two stages, that is, through rough and fine head positioning movements. The TAF slider function causes the heating resistor formed within the magnetic head to generate heat to protrude an end portion of the magnetic pole of the magnetic head and thereby control the flying height of the magnetic head above the magnetic disk surface.

Figure 2:
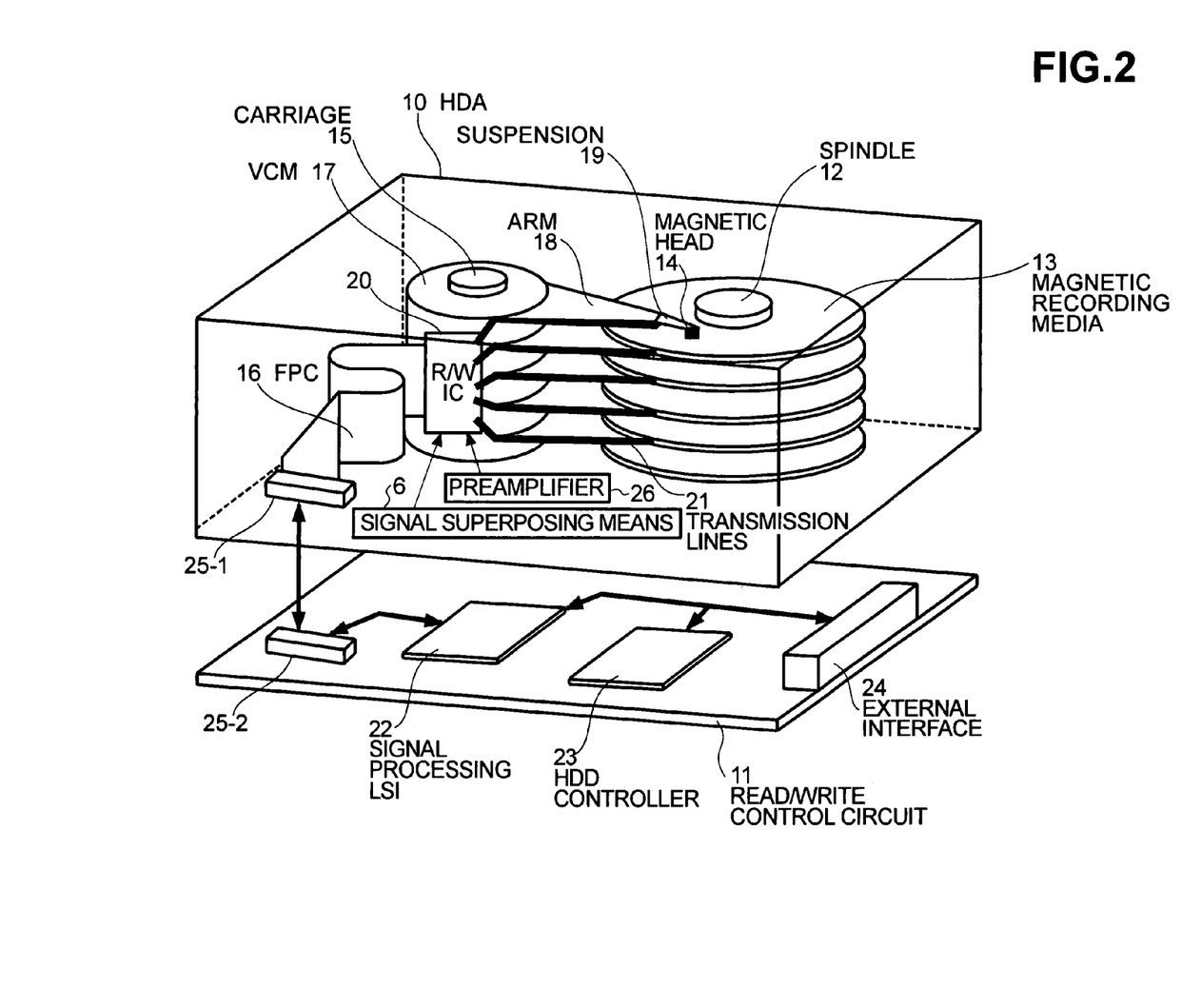
FIG. 2 is a diagram showing the configuration of a magnetic disk drive according to an embodiment of the present invention.

FIG. 2 is a diagram showing the configuration of a magnetic disk drive according to an embodiment of the present invention. The magnetic disk drive of the present embodiment comprises, for example, a head disk assembly (HDA) 10, a read/write control circuit 11, and other standard elements. HDA 10 includes: a spindle 12 on which magnetic recording media 13 are stacked; and a carriage 15 on which a magnetic head 14 is mounted to write/read information to/from a magnetic recording medium 13. HDA 10 is enclosed by aluminum plates or the like.

Carriage 15 includes: a voice coil motor (VCM) 17 for performing seek and positioning operations on magnetic head 14 over magnetic recording medium 13; an arm 18; a suspension 19 mounted on the tip of arm 18; magnetic head 14 mounted on the tip of suspension 19; a flexible patterned cable (FPC) 16 for transmitting each type of signal; a R/W IC 20 mounted on FPC 16; and transmission lines 21 for transmitting each type of signal between R/W IC 20 and magnetic head 14. Specifically, the assembly consisting of suspension 19, magnetic head 14, and transmission lines 21 is referred to as a head gimbal assembly (HGA) 100.

In carriage 15, the R/W IC 20 particularly includes: a preamplifier 26 for exchanging read/write information with magnetic head 14; and a signal superposing means 6 for merging two types of control signals into a single type of signal. Furthermore, preamplifier 26 and magnetic head 14 are connected to each other by way of transmission lines 21 for the read/write signals, while signal superposing means 6 and magnetic head 14 are connected to each other by way of transmission lines 21 for the two-stage actuator control signal and the TAF slider control signal.

Read/write control circuit 11 is connected between HDA 10 and an external device. Read/write control circuit 11 includes: a signal processing LSI 22 having a read/write control function, a two-stage actuator control function, and a TAF slider control function; and a hard disk drive (HDD) controller 23. Preamplifier 26 and signal superposing means 6 are connected to signal processing LSI 22 by connecting a connector 25-1 of HDA 10 with a connector 25-2 of read/write control circuit 11. HDA 10 is connected to an external device through an external interface 24 of read/write control circuit 11.

Figure 3:
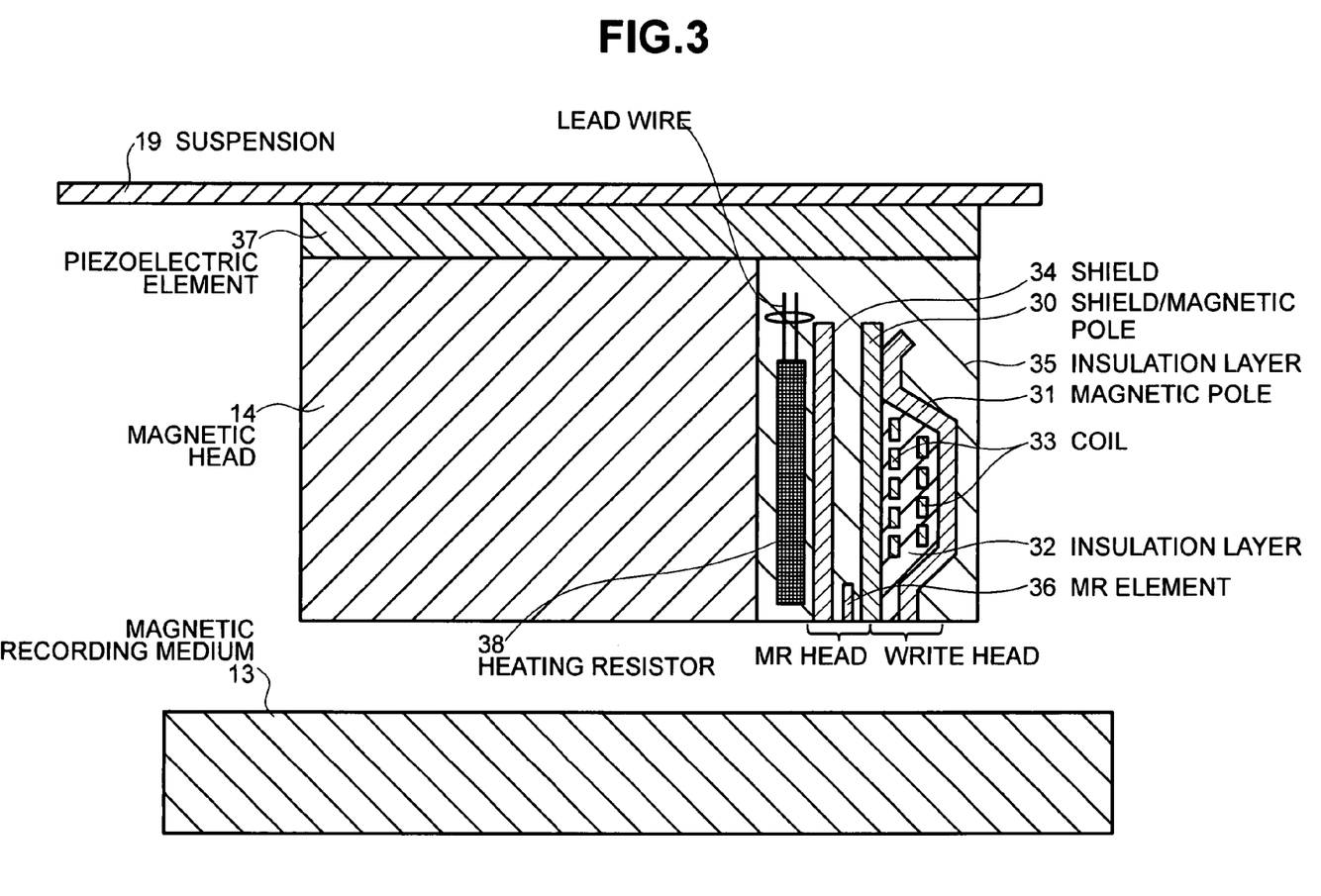
FIG. 3 is a cross-sectional view of the structure of a magnetic head in the magnetic disk drive of the embodiment.

FIG. 3 is a cross-sectional view of the structure of magnetic head 14 in the magnetic disk drive of the embodiment. Magnetic head 14 has a read/write function, a two-stage actuator function, and a TAF slider function. The read/write function (unit) is constructed so that the write head is formed by disposing a coil 33 within an insulation layer 32 enclosed by a shield/magnetic pole 30 and a magnetic pole 31, while the read head, which is typically a magnetoresistive (MR) head, is formed by disposing an MR element 36 within an insulation layer 35 enclosed by shield/magnetic pole 30 and a shield 34.

The two-stage actuator function (unit) is made up of magnetic head 14 and a piezoelectric element 37 disposed on magnetic head 14. A current is passed through piezoelectric element 37 to change its dimensions and thereby finely move the end portion of magnetic head 14. The TAF slider function (unit) is formed by disposing a heating resistor 38 within magnetic head 14. A current is passed through heating resistor 38 to cause it to generate heat and thereby protrude the end portion of magnetic head 14, reducing the gap between the end portion of magnetic head 14 and the disk surface of magnetic recording medium 13.

Figure 4:
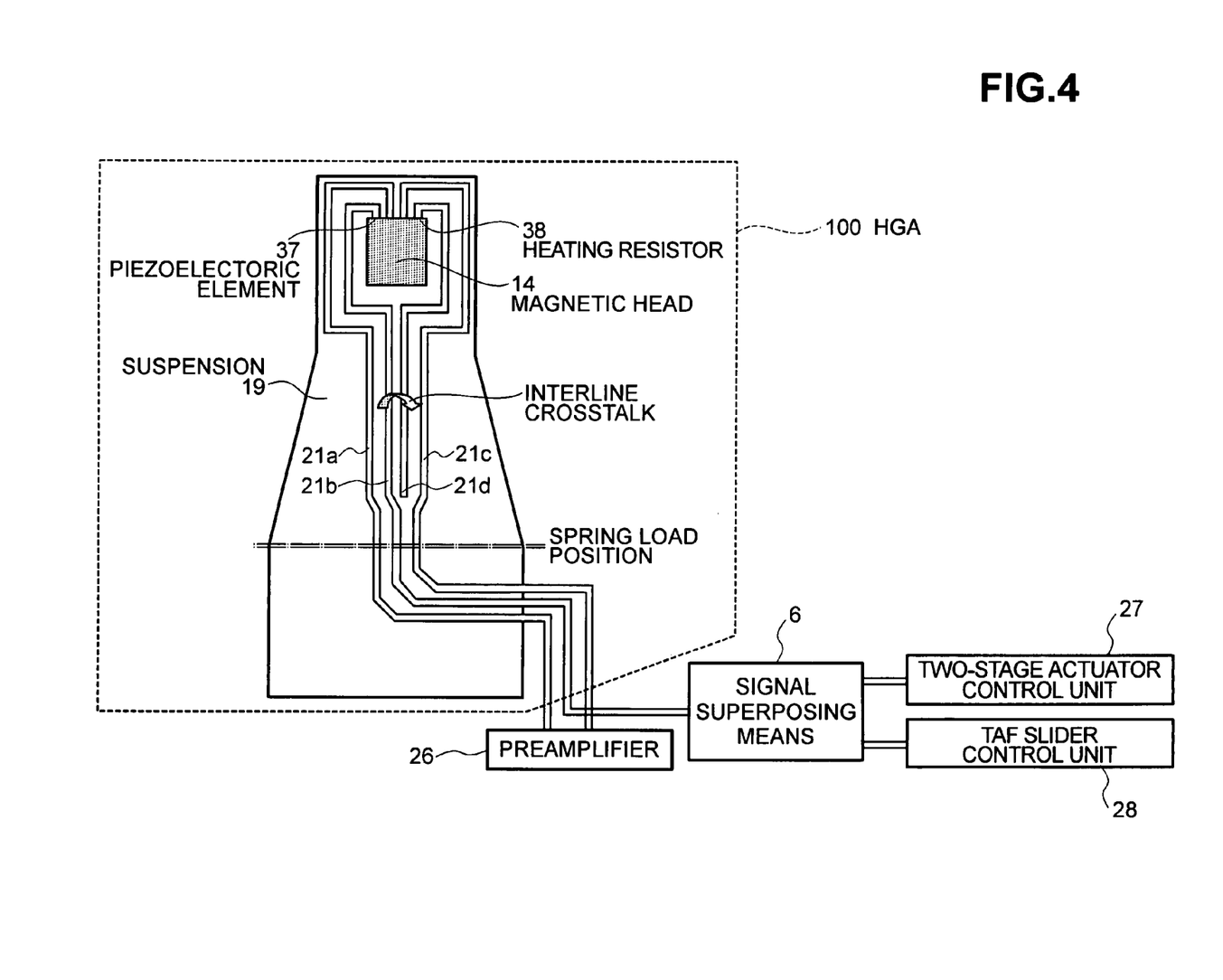
FIG. 4 is a schematic plan view of the transmission lines on an arm suspension in the magnetic disk drive of the embodiment.
Figure 5:
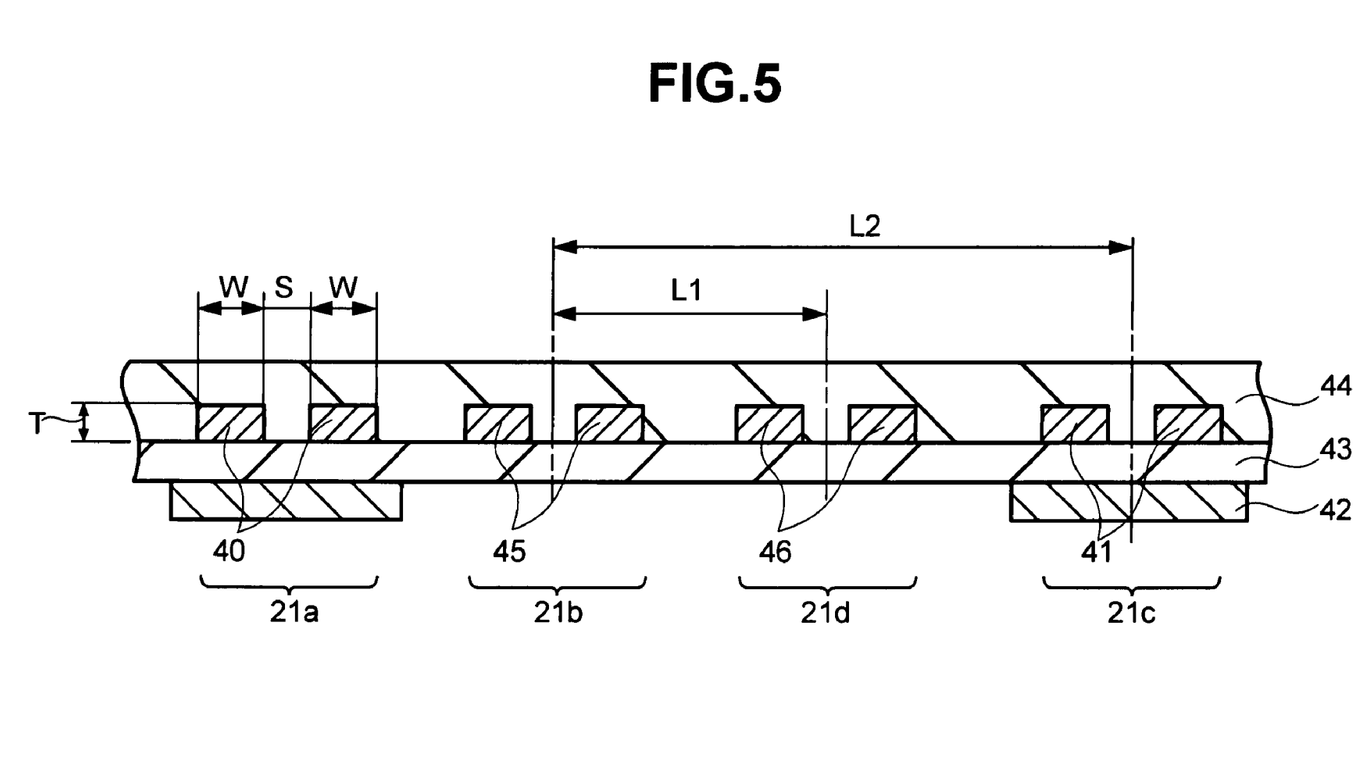
FIG. 5 is a schematic cross-sectional view of the structure of the transmission lines in the magnetic disk drive of the present embodiment.
Figure 6:
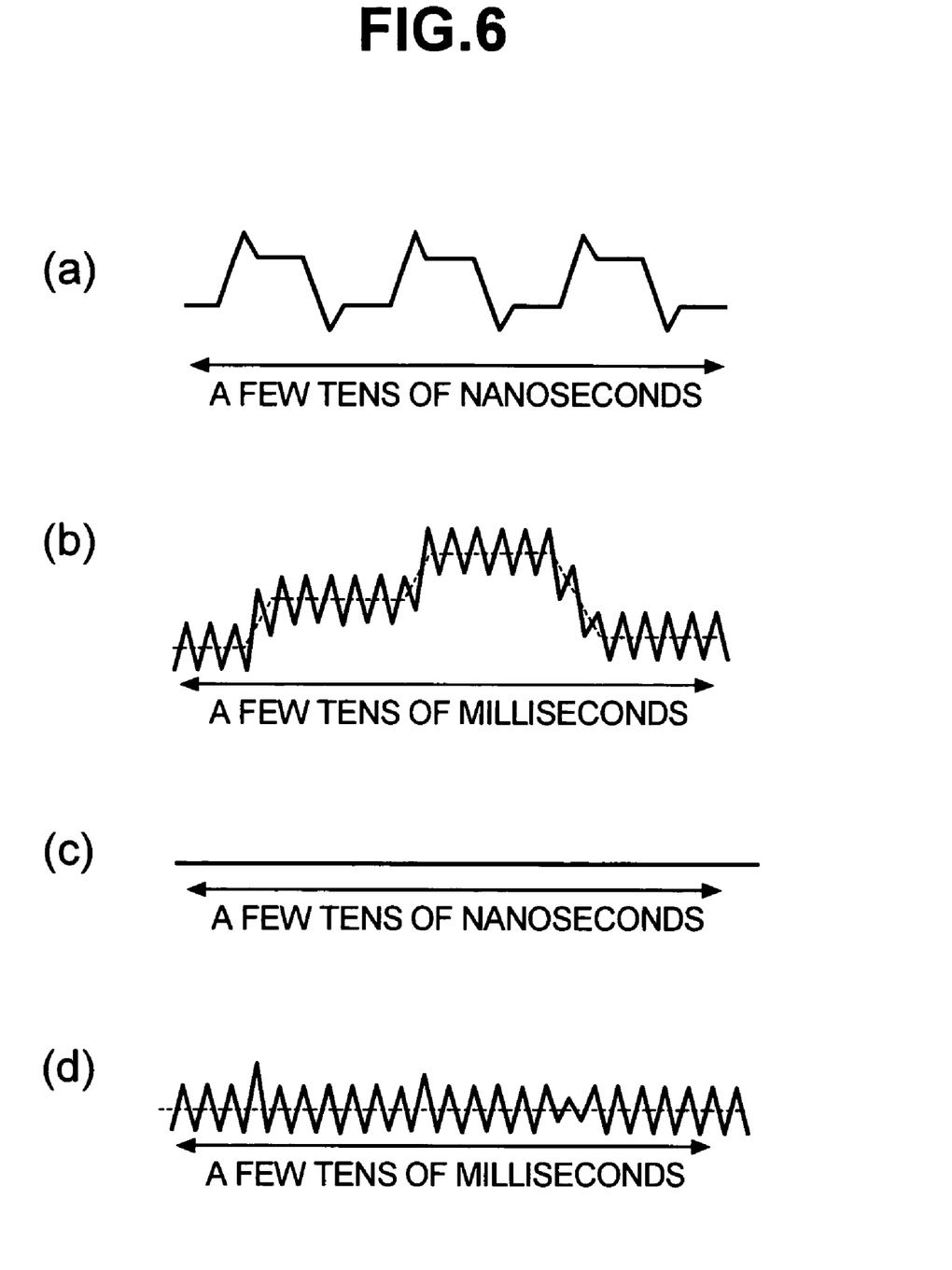
FIG. 6 includes segments (a) to (d) which are schematic diagrams showing the waveforms of the signals on the transmission lines in the magnetic disk drive of the present embodiment.

An example of the transmission lines on the arm suspension in the magnetic disk drive of the present embodiment is presented below with reference to FIGS. 4 to 6. FIG. 4 is a schematic plan view of the transmission lines on the arm suspension; FIG. 5 is a schematic cross-sectional view of the structure of the transmission lines; and FIG. 6 is a schematic diagram showing the waveforms (segments (a) to (d)) of the signals on the transmission lines.

As shown in FIG. 4, transmission lines 21, which run from preamplifier 26 and signal superposing means 6 to magnetic head 14, are disposed alongside arm 18. A portion of each transmission line 21 on suspension 19 is formed by printing. One end of each printed transmission line 21 is connected to magnetic head 14, which includes the write head, the read head, piezoelectric element 37 for the two-stage actuator function, and heating resistor 38 for the TAF slider function. The other end is connected to read/write preamplifier 26 and signal superposing means 6 for the two-stage actuator function and the TAF slider function.

Of the transmission lines 21, read/write transmission lines 21a and 21c (each consisting of two conductors, that is, four conductors in total) connected between preamplifier 26 and magnetic head 14 are disposed on suspension 19. Further, a transmission line 21b (consisting of two conductors) connected between signal superposing means 6 and magnetic head 14 is also disposed on suspension 19 to control piezoelectric element 37 for the two-stage actuator function. Still further, a transmission line 21d (consisting of two conductors) is disposed from a neighborhood of the spring-load position to the head to control heating resistor 38 for the TAF slider function. Signal separating means 7 uses the interline crosstalk between transmission line 21d and transmission line 21b.

Signal superposing means 6 and two-stage actuator control unit 27 are connected to each other by way of a transmission line consisting of two conductors. So are signal superposing means 6 and TAF slider control unit 28. That is, signal superposing means 6 merges the two transmission lines (four conductors) into the single transmission line 21b (two conductors). As described above, signal separating means 7 divides merged transmission line 21b into transmission lines 21b and 21d (each consisting of two conductors) to control piezoelectric element 37 for the two-stage actuator function and heating resistor 38 for the TAF slider function, respectively.

Of the transmission lines printed on suspension 19, write transmission line 21a and read transmission line 21c are disposed with a predetermined distance therebetween, and consist of a pair of write conductors 40 and a pair of read conductors 41, respectively, as shown in FIG. 5. Write conductors 40 and read conductors 41 are disposed on a base 43 laminated on the top of a lower conductor 42, and covered with a cover 44.

Furthermore, transmission line 21b for controlling piezoelectric element 37 for the two-stage actuator function and transmission line 21d for controlling heating resistor 38 for the TAF slider function are disposed alongside each other between write transmission line 21a and read transmission line 21c, and consist of a pair of piezoelectric element control conductors 45 and a pair of heating resistor control conductors 46, respectively. To deliberately produce interline crosstalk, piezoelectric element control conductors 45 and heating resistor control conductors 46 are disposed so that they run alongside each other with a predetermined distance therebetween on the portion of base 43 under which no lower conductor 42 exists.

In transmission lines 21 (21a, 21b, 21c, and 21d), for example, write conductors 40, read conductors 41, piezoelectric element control conductors 45, and heating resistor control conductors 46 are made of a metal such as copper; lower conductor 42 is made of a metal such as stainless steel or copper; and base 43 is made of insulating material.

FIG. 5 shows an example of the dimensions of transmission lines 21 and the distances between them. For example, assume that the conductor width W of each transmission line 21 is 60 $\mu$m, the interconductor distance S is 40 $\mu$m, and the conductor thickness T is 15 $\mu$m (this value is used for the 3.5 type; 10 $\mu$m is set for the 2.5 type). In such a case, the distance L1 between transmission line 21b for the two-stage actuator function and transmission line 21d for the TAF slider function may be set to, e.g., 260 μm or less (less than the other interline distances) to produce interline crosstalk, whereas the distance L2 between transmission line 21b and read transmission line 21c may be set to, e.g., 520 μm or more since the noise affects the read signal.

FIG. 6 shows the signals flowing through transmission lines 21. Specifically, the symbol (a) denotes a signal waveform on write transmission line 21a; (b) a signal waveform on transmission line 21b for the two-stage actuator function; (c) a signal waveform on read transmission line 21c; and (d) a signal waveform on transmission line 21d for the TAF slider function. It should be noted, however, that signal waveform (b) is obtained as a result of superposing the signals for the two-stage actuator function and the TAF slider function on each other, whereas the waveform (d) is actually the waveform of the signal for the TAF slider function separated from the waveform (b) through interline crosstalk.

As the number of functions of a magnetic disk drive increase, so do the number of control lines of the drive, resulting in an increase in the total rigidity of the transmission lines including the control lines. To reduce the total rigidity of the transmission lines in such a case, the present embodiment provides a method for reducing the number of transmission lines in a magnetic disk drive. Specifically, to reduce the number of transmission lines, the present embodiment superposes the control signals for the two-stage actuator function and the TAF slider function on each other and transmits the superposed signal through a single transmission line 21b (consisting of two conductors). The present embodiment then separates the superposed signal into the original control signals on the magnetic head side of the spring-load position of suspension 19 to control the respective functional units.

This superposition of the control signals is accomplished using the following physical phenomenon. To implement the two-stage actuator function, an actuator drive source is formed by use of piezoelectric element 37 which is an element whose dimensions change depending on the applied voltage. The change in the dimensions of piezoelectric element 37 can be "closed-controlled" by use of a servo signal, forming a servo mechanism. Piezoelectric element 37 changes its dimensions according to the voltage waveform. However, since the change is a dimensional change, it obeys only signals whose frequency is up to 30 kHz. This means that piezoelectric element 37 cannot be driven by applying to it a voltage signal of higher frequency than 30 kHz.

The TAF slider function, on the other hand, is implemented by passing a current through heating resistor 38 embedded in magnetic head 14 to heat the resistor and thereby change the dimensions of magnetic head 14, which is used to control the flying height. In other words, the TAF slider function is a control by heat from a heater. Therefore, since heating resistor 38 produces Joule heat even when a current of higher frequency than 30 kHz is applied to it, it is possible to control the TAF slider function.

Accordingly, for example, a control signal of up to 30 kHz for piezoelectric element 37 may be transmitted after it is superposed with a sinusoidal signal of 300 kHz (10 times the frequency 30 kHz of the control signal) determined by considering the frequency response characteristics of piezoelectric element 37. It should be noted that the frequency of the signal to be interposed on the control signal for piezoelectric element 37 is not limited to 10 times the frequency of the control signal. Any voltage signal whose frequency is higher than one-tenth the minimum frequency of the read signal may be used.

With the above arrangement, the number of transmission lines for the read/write signals and the superposed signal for the two-stage actuator function and the TAF slider function is reduced to three at the spring-load position (the number of conductors is reduced to 6). Transmission line 21d is disposed so that it runs close to and alongside transmission line 21b for the superposed signal from the spring-load position. The high-frequency component (the 300 kHz sinusoidal signal) of the superposed signal is coupled through the interline crosstalk to transmission line 21d for the TAF slider function running alongside transmission line 21b, thereby generating an induced current. This induced current is passed through heating resistor 38 so that heating resistor 38 can be used as a heat source.

There are two reasons why a sinusoidal signal is used as the control signal for the TAF slider function in the above arrangement. One is that even if this control signal interferes with the read/write signals as an interline interference, it has little influence on them since the control signal is a sinusoidal signal and therefore includes very few harmonic components.

The other reason is related to signal separating means 7, which functions as follows. The superposed signal flowing through transmission line 21b includes the control signal for the TAF slider function. When transmission line 21d, which is a closed loop, is disposed near transmission line 21b, only the control signal for the TAF slider function (the 300 kHz sinusoidal signal) is propagated through the interline crosstalk. Since the mode of this propagation through the interline crosstalk is magnetic induction, the differentiated waveform of the 300 kHz sinusoidal signal flowing through transmission line 21b appears on the transmission line 21d.

However, differentiating a sinusoidal wave produces another sinusoidal wave whose amplitude depends on the frequency. Since the frequency is constant, the amplitude of the induced signal is proportional to the amplitude of the sinusoidal signal flowing through transmission line 21b and reduced by an amount determined by only the transmission efficiency of the interline crosstalk through propagation. Further, even though both the control signal of up to 30 kHz and the 300 kHz control signal for the TAF slider function are input to piezoelectric element 37 for the two-stage actuator function, piezoelectric element 37 senses only a control signal of up to 30 kHz due to its (limited) response frequency band, making it possible to separate the superposed signal into the original signals.

As described above, the magnetic disk drive of the present embodiment has a two-stage actuator function and a TAF slider function and includes signal superposing means 6 and signal separating means 7 for the control signals for these functions. This arrangement allows reducing the number of transmission lines 21 at the spring-load position, thereby reducing the influence of the rigidity of the transmission lines on the spring-load. Further, it is also possible to reduce the influence of the rigidity of the transmission lines on the flying height of magnetic head 14 controlled by the spring-load, enhancing the read/write characteristics and reliability.

Still further, the control signals for the two-stage actuator function and the TAF slider function can be superposed on each other without interfering with each other, and furthermore these signals can be separated by use of interline crosstalk, making it possible to easily implement the above arrangement in a simple configuration. Still further, since interline crosstalk is used to separate the signals, extra energy is not required and only a minimum of transmission lines are required, making it possible to contribute to the reduction of the weight of suspension 19.

It should be noted that the present embodiment is described as applied to a magnetic disk drive having a two-stage actuator function and a TAF slider function. However, the present invention is not limited to this particular type of magnetic disk drive. The present invention can be applied to a magnetic disk drive having a function to raise the temperature of the head element of the magnetic head. In particular, the present invention can be suitably applied to a magnetic disk drive having an HGA which includes two or more types of control function units.

As can be seen, embodiments of the present invention, applied to an HGA including two or more types of control function units can decrease the number of transmission lines to be employed to reduce the (total) rigidity of the transmission lines, making it possible to reduce the influence of the rigidity of the transmission lines on the floating control using the load set for the HGA alone. As a result, it is possible to reduce the influence of the rigidity of the transmission lines on the flying height of the magnetic head controlled by the spring-load, enhancing the read/write characteristics and reliability.

In particular, in a magnetic disk drive having a two-stage actuator function and a TAF slider function, the signal superposing means can superpose the control signals for these functions on each other without causing the signals to interfere with each other. Furthermore, interline crosstalk can be used as the signal separating means, making it possible to easily implement the above arrangement in a simple configuration. Further, extra energy is not required to separate the signals and only a minimum of transmission lines are required, making it possible to contribute to the reduction of the weight of the suspension.

While the above is a complete description of specific embodiments of the invention, the above description should not be taken as limiting the scope of the invention as defined by the claims.

What is claimed is:

1. A magnetic disk drive including a magnetic head for writing/reading information to/from a magnetic recording medium and a preamplifier for exchanging read/write information with said magnetic head, said disk drive comprising:
   two or more types of control function units provided in said magnetic head;
   signal superposing means for merging two or more types of transmission lines into a single type of transmission line on the preamplifier side of a spring load position of a suspension, said two or more types of transmission lines transmitting control signals for said two or more types of control function units; and
   signal separating means for dividing said single type of transmission line into two or more types of transmission lines on the magnetic head side of said spring load position of said suspension.

2. The magnetic disk drive as claimed in claim 1, wherein:
   said two or more types of control function units include a first control function unit for implementing a two-stage actuator function and a second control function unit for implementing a flying height control slider function;
   said signal superposing means merges a first transmission line and a second transmission line into a third transmission line, said first transmission line transmitting a control signal for said first control function unit, said second transmission line transmitting a control signal for said second control function unit, each transmission line consisting of two conductors; and
   said signal separating means divides said merged third transmission line into a fourth transmission line and a fifth transmission line, said fourth transmission line transmitting a control signal for said first control function unit, said fifth transmission line transmitting a control signal for said second control function unit, each transmission line consisting of two conductors.

3. The magnetic disk drive as claimed in claim 2, wherein said signal superposing means superposes a signal of a first frequency with a signal of a second frequency for controlling a heating resistor of said second control function unit and transmits the superposed signal through said third transmission line, said first frequency being able to drive a piezoelectric element of said first control function unit, said second frequency being higher than said first frequency and unable to drive said piezoelectric element of said first control function unit.

4. The magnetic disk drive as claimed in claim 3, wherein said signal of said second frequency is made up of a sinusoidal signal.

5. The magnetic disk drive as claimed in claim 4, wherein said signal separating means uses interline crosstalk generated from said fourth transmission line to separate said signal of said second frequency and controls said heating resistor of said second control function unit through said fifth transmission line, said fourth transmission line being connected to said third transmission line, which transmits said superposed signal obtained as a result of superposing said signal of said first frequency with said signal of said second frequency.

6. A magnetic disk drive comprising:
   a magnetic recording medium;
   a magnetic head including
      a read element for reading information from said magnetic recording medium and providing read signals,
      a write element for writing information to said magnetic recording medium in response to write signals,
      a first control function unit, responsive to a first control signal, for effecting a first type of change in an operating characteristic of said magnetic head, and
      a second control function unit, responsive to a second control signal, for effecting a second type of change in an operating characteristic of said magnetic head;
   a suspension for supporting said magnetic head, said suspension having a spring load position;
   a transmission line segment spanning said spring load position;
   a signal superposition element that receives first and second signals and combines them to provide a combined signal directed along said transmission line segment spanning said spring load position toward said magnetic head; and
   a signal separation element on said suspension that
      receives said combined signal after said combined signal has traveled past said spring load position, and
      directs separate signals along first and second transmission line segments to said first and second control function units, respectively, to provide said first and second control signals.

7. The magnetic disk drive as claimed in claim 6, wherein:
   said first control function unit is configured to implement a two-stage actuator function and said second control function unit is configured to implement a flying height control slider function.

8. The magnetic disk drive as claimed in claim 7, wherein:
said signal superposition element is configured to merge a first transmission line and a second transmission line into a third transmission line to provide the combined signal to be directed along said transmission line segment spanning said spring load position toward said magnetic head, said first transmission line transmitting the first control signal for said first control function unit, said second transmission line transmitting the control signal for said second control function unit, each transmission line consisting of two conductors.

9. The magnetic disk drive as claimed in claim 8, wherein:
said first and second transmission line segments each consist of two conductors.

10. The magnetic disk drive as claimed in claim 9, wherein said signal superposing element is configured to superpose a signal of a first frequency with a signal of a second frequency for controlling a heating resistor of said second control function unit and transmit the superposed signal through said third transmission line, said first frequency being able to drive a piezoelectric element of said first control function unit, said second frequency being higher than said first frequency and unable to drive said piezoelectric element of said first control function unit.

11. The magnetic disk drive as claimed in claim 10, wherein said signal of said second frequency is made up of a sinusoidal signal.

12. The magnetic disk drive as claimed in claim 11, wherein said signal separation element is configured to use interline crosstalk generated from said first transmission line segment to separate said signal of said second frequency and control said heating resistor of said second control function unit through said second transmission line segment, said first transmission line segment being connected to said transmission line segment spanning said spring load position, which transmits said superposed signal obtained as a result of superposing said signal of said first frequency with said signal of said second frequency.

* * * * *